(12) United States Patent
Vichinsky et al.

(10) Patent No.: US 7,407,057 B2
(45) Date of Patent: Aug. 5, 2008

(54) PLASTIC TRANSMISSION FILTER

(75) Inventors: Kevin Vichinsky, Portage, MI (US);
Stuart Miller, Kalamazoo, MI (US);
Bruce Bounnakhom, Kalamazoo, MI (US)

(73) Assignee: Mann & Hummel GmbH, Ludwigsburg (DE)

( * ) Notice: Subject to any disclaimer, the term of this patent is extended or adjusted under 35 U.S.C. 154(b) by 511 days.

(21) Appl. No.: 10/528,427

(22) PCT Filed: Sep. 17, 2003

(86) PCT No.: PCT/US03/29250

§ 371 (c)(1),
(2), (4) Date: Mar. 18, 2005

(87) PCT Pub. No.: WO2004/026433

PCT Pub. Date: Apr. 1, 2004

(65) Prior Publication Data

US 2007/0000832 A1      Jan. 4, 2007

(51) Int. Cl.
*B01D 35/02* (2006.01)

(52) U.S. Cl. .................. 210/437; 210/445; 210/457; 210/167.08; 156/308.2

(58) Field of Classification Search ............ 210/167.08, 210/171, 172.3, 172.4, 437, 445, 455, 457, 210/486; 156/73.1, 308.2
See application file for complete search history.

(56) References Cited

U.S. PATENT DOCUMENTS 2,639,251 A * 5/1953 Kracklauer .................. 156/92
5,049,274 A * 9/1991 Leason et al. ................ 210/445
5,853,577 A * 12/1998 Gizowski et al. ........ 210/167.08

FOREIGN PATENT DOCUMENTS

DE          19610414 A1 * 9/1997

* cited by examiner

*Primary Examiner*—Matthew O Savage
(74) *Attorney, Agent, or Firm*—Crowell & Moring LLP

(57) ABSTRACT

A plastic transmission filter (1) composed of mating upper (2) and lower (3) shells of synthetic resin material with at least one set of registering weld posts (10) extending between inner surfaces of the upper and lower shells; a fluid pervious centertube (4) interposed between the mating shells around the weld posts, and a filter material (5) wrapped around the centertube to form a bag filter. The filter assembly can be welded together in a single vibration welding operation and provides enhanced flow of transmission fluid by avoiding flow restrictions caused by prior art reinforcement poles.

15 Claims, 3 Drawing Sheets

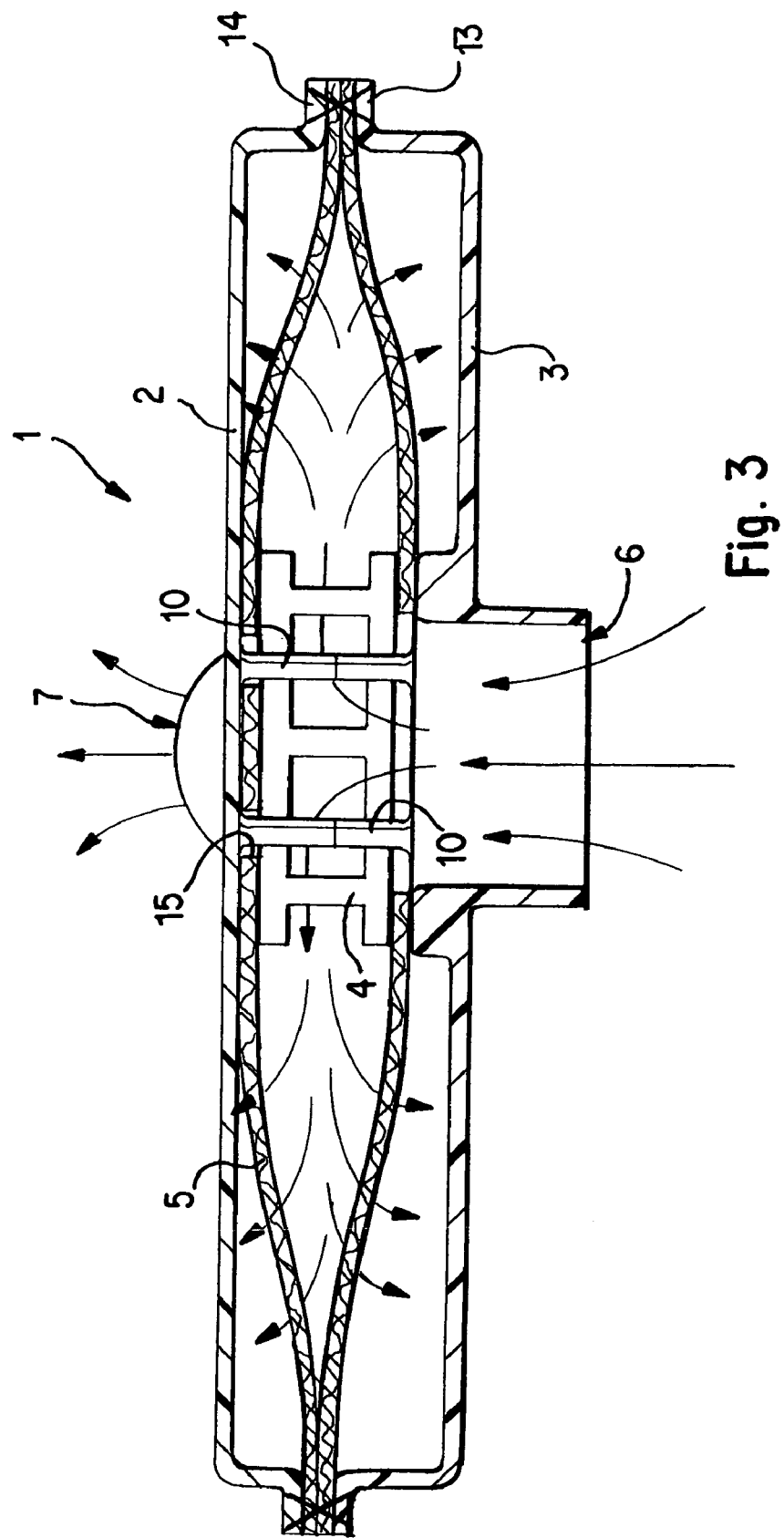

PLASTIC TRANSMISSION FILTER

BACKGROUND OF THE INVENTION

Plastic transmission filters are used in approximately 10% of the Car industry. The current plastic transmission filter used in the market requires a complex assembly process. In addition, current transmission filter designs cause a very high pressure drop across the filter assembly, resulting in pump cavitation.

The current plastic transmission filter assembly process requires the filter media to be welded or glued to the filter lower shell at the fluid inlet, and then the upper shell is subsequently welded to the lower shell. This requires two welding processes, which adds both inconvenience and expense to the manufacturing process.

The plastic transmission filter housing has a tendency to collapse from the pressure drop during cold flow. The conventional solution in the market has been to add poles to the upper shell and lower shell to prevent the filter housing from collapsing. However this solution causes a problem by pintching the media at the poles, resulting in increased flow restriction inside the filter.

SUMMARY OF THE INVENTION

The plastic transmission filter of the present invention is unique for two reasons. First, the design allows us to assemble the filter in a single welding operation. Second, the design allows better flow by decreasing the flow restriction in the filter assembly. The design features responsible for these improvements are the centertube and weld posts located at fluid inlet.

The weld posts and the centertube are advantageous in two ways. First, the centertube and weld posts increase the structural strength inside the filter. This results in minimizing the filter collapse at cold flow pressure drop. Second, the centertube and weld posts provide decreased flow resistance and increased flow by eliminating the previously used poles which caused flow restrictions by pinching the filter medium.

The transmission filter of the present invention can be used in all types of automotive transmissions which require fluid filtration, as well as in other filtration applications.

BRIEF DESCRIPTION OF THE DRAWINGS

The invention will be described in further detail hereinafter with reference to illustrative preferred embodiments shown in the accompanying drawings in which:

FIG. 3 is a cross-sectional view showing how the filter material is clamped between the upper and lower shells and the centertube to form a bag filter.

DETAILED DESCRIPTION OF PREFERRED EMBODIMENTS

Figure 1:
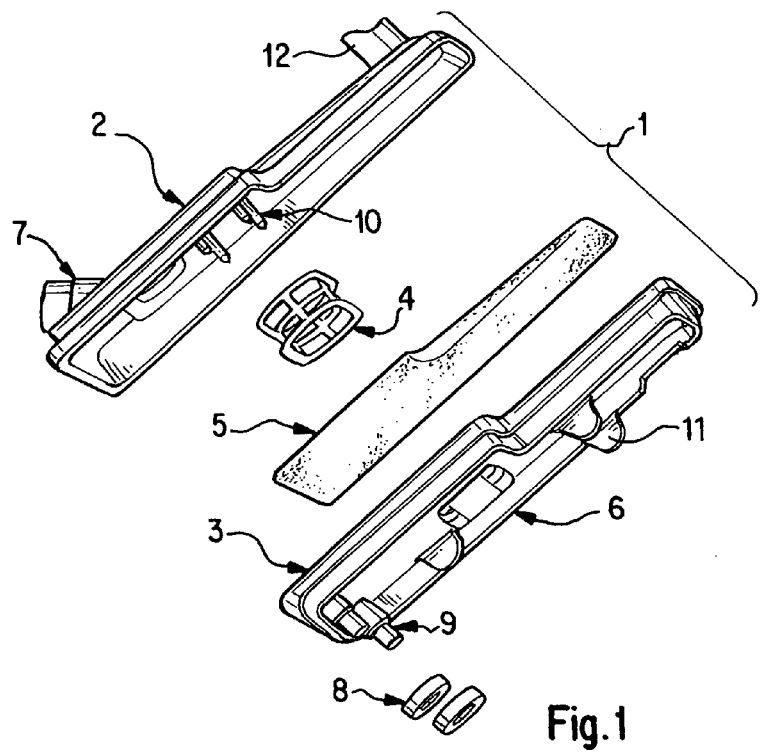
FIG. 1 is an exploded perspective view of a filter according to the invention.

FIG. 1 shows an exploded view of a transmission filter 1 according to the present invention. The filter 1 comprises an upper shell 2 and a lower shell 3, each molded from a suitable synthetic resin material. An example of a suitable material is a glass fiber reinforced polyamide plastic known as PA66GF33, which signifies a nylon 66 resin reinforced with 33% glass fibers. Upper shell 2 and lower shell 3 mate together to form a filter housing. The two shells are each provided in a central region with a plurality of registering welding posts 10 which engage each other to prevent the housing from collapsing when the filter is subjected to a high pressure differential.

Further reinforcement is provided by an open mesh centertube 4 which is also interposed between upper shell 2 and lower shell 3 surrounding the welding posts 10. Centertube 4 is likewise made of thermoplastic synthetic resin material which can be readily welded to the material of upper and lower shells 2 and 3. Transmission fluid is drawn into the filter housing through an inlet 6 formed in the bottom of lower shell 3 which opens into centertube 4. The fluid then passes through the openings in the mesh of the centertube into a surrounding bag filter 5. The bag filter 5 may be formed from a conventional non-woven filter fleece. After passing through the bag filter 5, the now filtered fluid exits the filter housing through an outlet 7 which communicates with a pump (not shown) which pumps the fluid through the transmission circuit.

On the outside of lower shell 3 are shown two magnet support posts 9. Ring-shaped magnets 8 are disposed on these posts, and then the free ends of the posts are melted slightly to lock the annular magnets in place. The magnets are thus mounted immersed in the transmission fluid surrounding the filter in the transmission case where they can capture metal particles which may be present in the fluid.

Support tabs 11 may be molded on the outer surface of lower shell 3 and support tabs 12 may be molded on the outer surface of upper shell 2 to assure proper positioning of the filter housing within the transmission case.

Figure 2:
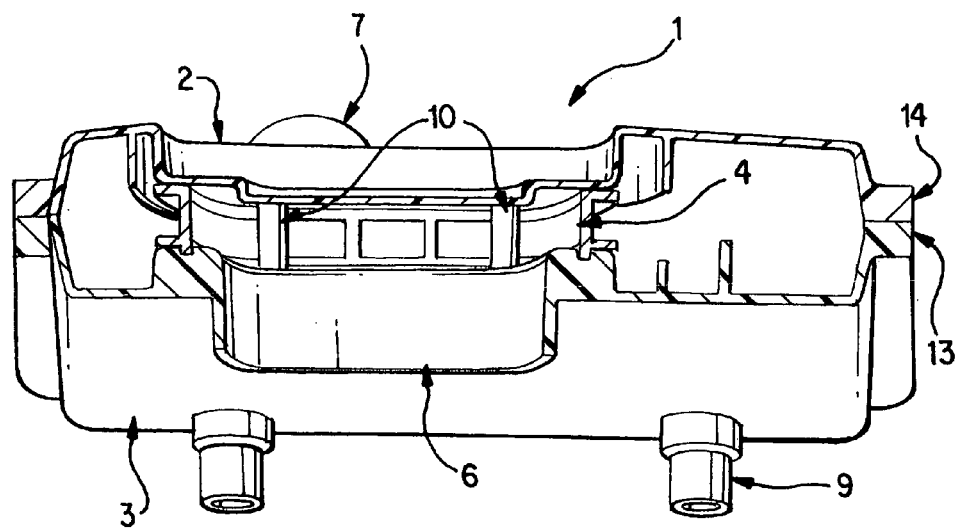
FIG. 2 is a vertical sectional view of an assembled filter according to the invention.

FIG. 2 shows the assembled transmission filter of the invention in a sectional view. The registering alignment of the weld posts 10 on the upper and lower shells 2 and 3 can be clearly seen in the drawing. The filter media which form bag filter 5 is provided with a central aperture through which the weld posts 10 extend, and the material surrounding the central aperture is clamped between the upper axial face of centertube 4 and the adjacent inside surface of upper shell 2. The filter medium is then folded back over the centertube 4 and clamped between the lower axial face of centertube 4 and the adjacent inside surface of lower shell 3. A through hole 16 (FIG. 4A) aligned with inlet 6 is provided in the filter medium to enable the fluid from the inlet to freely enter the centertube.

If desired, alignment holes 15 can be formed in the filter medium to fit over the weld posts 10 inside centertube 4 to assure proper alignment of the filter material. The periphery of the folded filter medium is clamped between the outer flanges 13 and 14 of the respective lower and upper shells. As a result of this construction, it is possible to weld the the upper axial face of centertube 4 to upper shell 2, the lower axial face of centertube 4 to lower shell 3, the registering weld posts 10 of the upper and lower shells 2 and 3 to each other, and the outer flanges 13 and 14 of the lower and upper shells to each other in a single vibration welding operation with the filter media properly positioned between the parts to form a bag filter through which the transmission fluid must pass to move from the inlet 6 to the outlet 7.

FIG. 3 is a sectional view depicting the arrangement of the filter medium 5 in between upper and lower shells 2 and 3 and centertube 4. The registering alignment of weld posts 10 on upper and lower shells 2 and 3 is also illustrated. In addition, it can be clearly seen from this figure how weld posts 10 can be inserted through alignment holes 15 in the filter medium 5 to assure proper positioning of the filter medium. Likewise, It can be seen how the filter medium 5 is clamped between one axial end face of centertube 4 and the inside surface of upper shell 2, between the other axial end face of centertube 4 and the inside surface of lower shell 3, and between the outer flanges 13 and 14 of lower shell 3 and upper shell 2, respectively, to form a bag filter. The arrows in the figure illustrate how fluid is drawn in through inlet opening 6 into centertube 4, flows radially outwardly through the pervious sides of centertube 4 into the surrounding bag filter 5, passes through the bag filter, and thence is discharged through outlet opening 7 to a pump (not shown). From this figure it can also be seen how the joints between the end of the centertube and the inside surfaces of the upper and lower shells, between the ends of the reinforcing weld posts, and between the peripheral flanges of the upper and lower shells can all be welded at the same time in a single vibration welding operation.

Figure 4B:
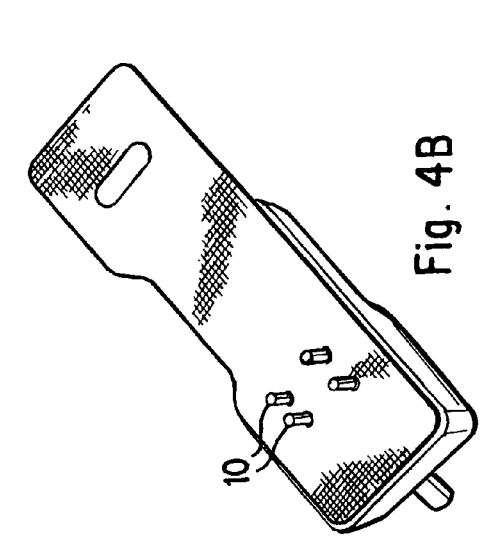
FIGS. 4A through 4E illustrate the assempaly of the transmission filter of the inveniton.
Figure 4E:
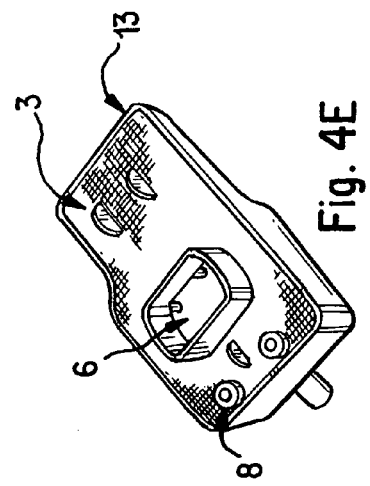
Figure 4A:
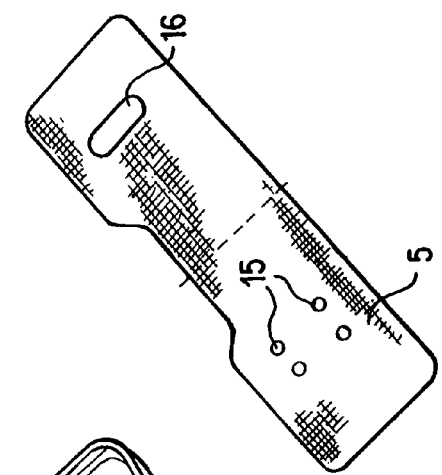
Figure 4D:
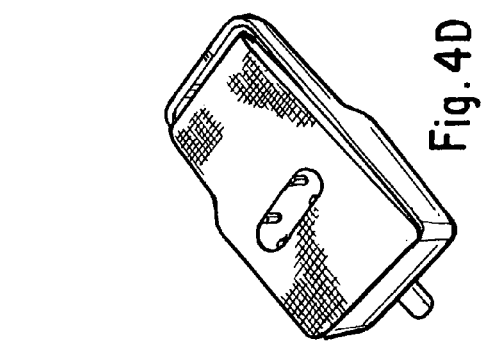
Figure 4C:
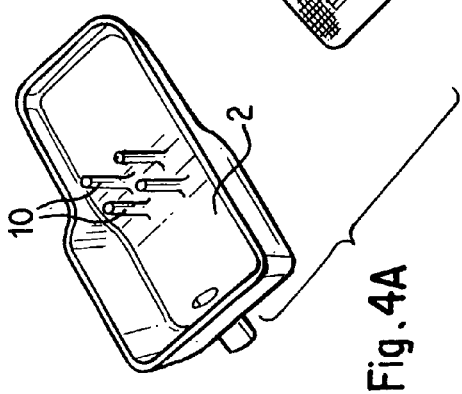

FIGS. 4A through 4E illustrate the assembly of the transmission filter of the invention as follows: (1) First the upper shell 2 is turned inside facing up as shown in FIG. 4A. (2) Next, the filter media element 5 is placed on top of the upper shell and aligned by the welding poles 10, which extend through alignment apertures 15 in the filter media 5 as can be seen in FIG. 4B. (3) Then, the centertube 4 is placed on top of the filter media 5 surrounding the welding poles 10 as shown in FIG. 4C. This clamps the filter medium between one axial end face of the centertube and the inside surface of the upper shell. The position of centertube 4 is such that it will be aligned with inlet 6 in lower shell 3 when the lower shell is mated with the rest of the assembly. (4) Afterward, the filter media is folded into bag configuration and positioned around the centertube as shown in FIG. 4D. An inlet hole 16 is provided in the filter medium 5 which is aligned with centertube 4 so that fluid from inlet 6 can freely enter the centertube. (5) Finally, the lower shell 3 is placed on top with the filter media captured between the perimeter flanges 13 and 14 of the upper and lower shells, and the assembled parts are joined by a single vibration welding operation.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A transmission filter comprising a first shell having an inlet opening, a second shell having an outlet opening; said first and second shells mating with each other to form a filter housing, a fluid pervious centertube disposed in the filter housing between the first and second shells such that the inlet opening communicates with the interior of the centertube, at least one set of registering weld posts on interior surfaces of said first and second shells that engage each other to prevent the housing from collapsing when the filter is subjected to a high pressure differential, and a filter medium clamped between the first and second shells and the centertube to form a filter surrounding the centertube through which fluid moving from the inlet opening to the outlet opening must pass.

2. A transmission filter according to claim 1, wherein the filter material is clamped between the first shell and the center tube, between the second shell and the centertube, and between the first and second shells to form a bag filter surrounding the centertube.

3. A transmission filter according to claim 1, wherein the center tube has a mesh structure.

4. A transmission filter according to claim 1, wherein the first and second shells and the centertube are made of a thermoplastic synthetic resin material.

5. A transmission filter according to claim 4, wherein said synthetic resin material is a thermoplastic polyamide material.

6. A transmission filter according to claim 4, wherein said synthetic resin material is reinforced with glass fibers.

7. A transmission filter according to claim 4, wherein said synthetic resin material is glass fiber reinforced nylon.

8. A transmission filter according to claim 1, wherein said first and second shells and said centertube are vibration welded together with said filter material between them in a single welding operation.

9. A transmission filter according to claim 1, wherein said at least one set of registering weld posts are disposed within said centertube.

10. A method of making a filter comprising:
   providing mateable first and second synthetic resin shells with respective inlet and outlet openings, said shells having at least one set of registering weld posts on inside surfaces thereof that engage each other to prevent the housing from collapsing when the filter is subjected to a high pressure differential;
   disposing a central portion of a filter web against an inside surface of one of said shells;
   disposing a fluid pervious centertube against said central portion of said filter web to clamp said filter web against said one shell;
   wrapping said filter web around said centertube to form a filter bag;
   mating the other of said shells with said one shell with the weld posts on their inside surfaces registering to form a filter housing, whereby a peripheral portion of said filter material is clamped between said centertube and said other shell; and
   welding the first and second shells and the centertube together in a single welding step with the filter bag clamped between them such that fluid moving from the inlet opening to the outlet opening must pass through the filter bag.

11. A method according to claim 10, wherein alignment apertures in the filter material are placed over the weld posts when the filter material is placed in the first shell to assure proper positioning of the resulting filter bag.

12. A method according to claim 10, wherein said centertube has a mesh structure.

13. A method according to claim 10, wherein said first and second shells and said center tube are made of injection molded thermoplastic synthetic resin material.

14. A method according to claim 13, wherein said synthetic resin material is a glass fiber reinforced polyamide material.

15. A method according to claim 10, further comprising the step of disposing said at least one set of registering weld posts within said centertube.

* * * * *